United States Patent
Sohn et al.

(10) Patent No.: US 9,098,936 B2
(45) Date of Patent: Aug. 4, 2015

(54) APPARATUS AND METHOD FOR ENHANCING STEREOSCOPIC IMAGE, RECORDED MEDIUM THEREOF

(71) Applicant: Industry-Academic Cooperation Foundation, Yonsei University, Seoul (KR)

(72) Inventors: Kwang-Hoon Sohn, Seoul (KR); Hyoung-Chul Shin, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 258 days.

(21) Appl. No.: 13/722,732

(22) Filed: Dec. 20, 2012

(65) Prior Publication Data

US 2013/0163856 A1    Jun. 27, 2013

(30) Foreign Application Priority Data

Dec. 23, 2011    (KR) .................... 10-2011-0140709

(51) Int. Cl.
*G06T 19/20*    (2011.01)
*H04N 13/00*    (2006.01)

(52) U.S. Cl.
CPC ............ *G06T 19/20* (2013.01); *H04N 13/0025* (2013.01)

(58) Field of Classification Search
CPC ............................ G06T 19/20; H04N 13/0025
USPC ................. 382/154, 162–167; 345/419–427; 348/42; 358/518–523; 356/12
See application file for complete search history.

(56) References Cited

U.S. PATENT DOCUMENTS

| | | | |
|---|---|---|---|
| 5,917,937 A * | 6/1999 | Szeliski et al. | 382/154 |
| 2004/0056857 A1 * | 3/2004 | Zhang et al. | 345/419 |
| 2007/0031037 A1 * | 2/2007 | Blake et al. | 382/173 |
| 2010/0290697 A1 * | 11/2010 | Benitez et al. | 382/154 |

FOREIGN PATENT DOCUMENTS

| | | |
|---|---|---|
| JP | 2011146936 A | 7/2011 |
| KR | 1019980080891 A | 11/1998 |
| KR | 1020060063575 A | 6/2006 |
| KR | 1020090064243 A | 6/2009 |

OTHER PUBLICATIONS

Zheng Gu et al. "Local stereo matching with adaptive support-weight, rank transform and disparity calibration", Science Direct, Pattern Recognition Letters 29 (2008) pp. 1230-1235.*

* cited by examiner

*Primary Examiner* — Samir Ahmed
(74) *Attorney, Agent, or Firm* — TechLaw LLP

(57) ABSTRACT

An apparatus for enhancing a stereoscopic image may include: a color relationship extraction unit, which extracts color relationships between a plurality of first coordinates in a 3-dimensional color space for a first image and second coordinates in a 3-dimensional color space for a second image corresponding to the plurality of first coordinates; a color relationship correction unit, which corrects a color relationship for any one first coordinate from among the plurality of first coordinates based on a color relationship of at least one first coordinate existing within a particular distance from the any one first coordinate; and a color value transformation unit, which transforms a color value of the first image by using the corrected color relationship of the any one first coordinate. The invention provides the advantage of accurately correcting color imbalance between the left image and right image forming a stereoscopic image.

1 Claim, 7 Drawing Sheets

(a)

(b)

APPARATUS AND METHOD FOR ENHANCING STEREOSCOPIC IMAGE, RECORDED MEDIUM THEREOF

CROSS-REFERENCE TO RELATED APPLICATIONS

This application claims the benefit of Korean Patent Application No. 10-2011-0140709, filed with the Korean Intellectual Property Office on Dec. 23, 2011, the disclosure of which is incorporated herein by reference in its entirety.

BACKGROUND

1. Technical Field

Embodiments of the present invention relate to enhancing the quality of a stereoscopic image, more particularly to an apparatus, a method, and a recorded medium that can enhance the quality of a stereoscopic image by accurately correcting any color imbalance between the left image and right image forming the stereoscopic image.

2. Description of the Related Art

A stereo image refers to a left and a right image obtained by stereoscopic cameras. Depending on the radiometric properties of each stereoscopic camera and on changes in lighting conditions, there can be differences in the left and right images.

Differences between the left and right images may cause fatigue for persons viewing the stereo image, and as such, an algorithm for compensating such differences can be applied, including image color correction for compensating the luminance and chrominance between the left and right images.

Research on color correction for stereo images can be divided mainly into two types of methods.

The first method is to resolve color mismatching by using color response functions measured beforehand for the respective cameras. Here, a color response function can be obtained by independently correcting each camera by comparing the object being subject to correction with known colors. However, this method entails the inconvenience of having to repeat the complicated set of correction procedures every time there is a change in lighting conditions.

The second method is based on image processing and does not require a reference object for the correction. This method can be divided again into a global method and a local method.

The global method involves correcting color imbalance by applying a linear transformation to colors of the whole image. As this method does not consider partial lighting or the properties of individual colors, there is the drawback that the transformed image may partially include saturated or lost colors.

The local method, in order to supplement the drawback of the global method, applies different transformations for partial areas when correcting color imbalance, instead of applying a transformation on to the whole image. Unlike the global method, this method may require color matching, for which a feature-point matching algorithm is typically used.

If an insufficient number of color matching points are extracted for a partial area being transformed, the local method may provide unstable performance.

Also, the global method and the local method both performs the transformation separately for each channel, but since the channels of an image are interrelated, it may be difficult to accurately perform the transformation to a reference color when using independent processing for each channel.

Furthermore, even though the degree and tendency of color imbalance for a multi-view image may vary according to the color of the picture element, i.e., the position of the picture element color within a color space, existing methods apply the correction with a single transformation for picture elements of different colors, and thus cannot correct color imbalance accurately.

SUMMARY

To resolve the problems described above, an objective of the invention is to provide an apparatus, a method, and a corresponding recorded medium, which can enhance the quality of a stereoscopic image by accurately correcting color imbalance between the left image and right image forming the stereoscopic image.

To achieve this objective, an embodiment of the invention provides an apparatus for enhancing a stereoscopic image that includes: a color relationship extraction unit, which extracts color relationships between a plurality of first coordinates in a 3-dimensional color space for a first image and second coordinates in a 3-dimensional color space for a second image corresponding to the plurality of first coordinates; a color relationship correction unit, which corrects a color relationship for any one first coordinate from among the plurality of first coordinates based on a color relationship of at least one first coordinate existing within a particular distance from the any one first coordinate; and a color value transformation unit, which transforms a color value of the first image by using the corrected color relationship of the any one first coordinate.

The color relationship correction unit can correct the color relationship of the any one first coordinate to correspond to an average of the color relationship of the at least one first coordinate.

The plurality of first coordinates can be the coordinates of a plurality of first pixels forming the first image, and the plurality of second coordinates can be the coordinates of a plurality of second pixels forming the second image.

The color relationship correction unit can select two or more first pixels existing within a particular area encompassing any one first pixel from among the plurality of first pixels, select one or more first pixels from among the two or more first pixels that have first coordinates existing within the particular distance from the first coordinate of the any one first pixel, and correct a color relationship of the any one first pixel based on a color relationship of the one or more first pixels.

The apparatus for enhancing a stereoscopic image can further include a reference image selection unit configured to select any one reference image from between the first image and the second image based on a distribution of coordinates in the 3-dimensional color space of the first image and a distribution of coordinates in the 3-dimensional color space of the second image.

The 3-dimensional color space can be a CIELab color space.

The color relationship correction unit can correct the color relationship of the any one first pixel according to the equations listed below:

$$\hat{A}(p, q) = \frac{1}{N_T} \sum_{i,j \in W} D_c[Y(i,j)],$$

-continued $$D_c[Y(i,j)] = \begin{cases} A(i,j), & \text{if } \|Y(i,j) - Y(p,q)\|^2 \leq T_d \\ 0, & \text{if } \|Y(i,j) - Y(p,q)\|^2 > T_d, \end{cases}$$

where (p, q) is a position of the any one first pixel, W is the particular area, (i, j) is a position of each of the two or more first pixels existing within the particular area, Y(i, j) is a vector in a 3-dimensional color space for each of the two or more first pixels located at (i, j), A(i, j) is a color relationship of each of the two or more first pixels located at (i, j), $T_d$ is the particular distance, $D_c$ is an operator for selecting the one or more first pixels having first coordinates existing within the particular distance, $N_T$ is a number of the one or more first pixels having first coordinates existing within the particular distance, and Â(p, q) is the corrected color relationship of each of the one or more first pixels.

Another embodiment of the invention provides a method for enhancing a stereoscopic image that includes: extracting color relationships between a plurality of first coordinates in a 3-dimensional color space for a first image and second coordinates in a 3-dimensional color space for a second image corresponding to the plurality of first coordinates; correcting a color relationship for any one first coordinate from among the plurality of first coordinates based on a color relationship of at least one first coordinate existing within a particular distance from the any one first coordinate; and transforming a color value of the first image by using the corrected color relationship of the any one first coordinate.

The correcting can involve correcting the color relationship of the any one first coordinate to correspond to an average of the color relationship of the at least one first coordinate.

The method for enhancing a stereoscopic image can further include: selecting any one reference image from among the first image and the second image based on a distribution of coordinates in the 3-dimensional color space of the first image and a distribution of coordinates in the 3-dimensional color space of the second image.

Yet another embodiment of the invention provides a recorded medium readable by a digital processing device, tangibly embodying a program of instructions executable by the digital processing device to perform a method for enhancing a stereoscopic image that includes: extracting color relationships between a plurality of first coordinates in a 3-dimensional color space for a first image and second coordinates in a 3-dimensional color space for a second image corresponding to the plurality of first coordinates; correcting a color relationship for any one first coordinate from among the plurality of first coordinates based on a color relationship of at least one first coordinate existing within a particular distance from the any one first coordinate; and transform a color value of the first image by using the corrected color relationship of the any one first coordinate.

The invention provides the advantage of accurately correcting color imbalance between the left image and right image forming a stereoscopic image, to thereby enhance the quality of the stereoscopic image and reduce the fatigue experienced by persons viewing the stereoscopic image.

Additional aspects and advantages of the present invention will be set forth in part in the description which follows, and in part will be obvious from the description, or may be learned by practice of the invention.

DETAILED DESCRIPTION

Figure 1:
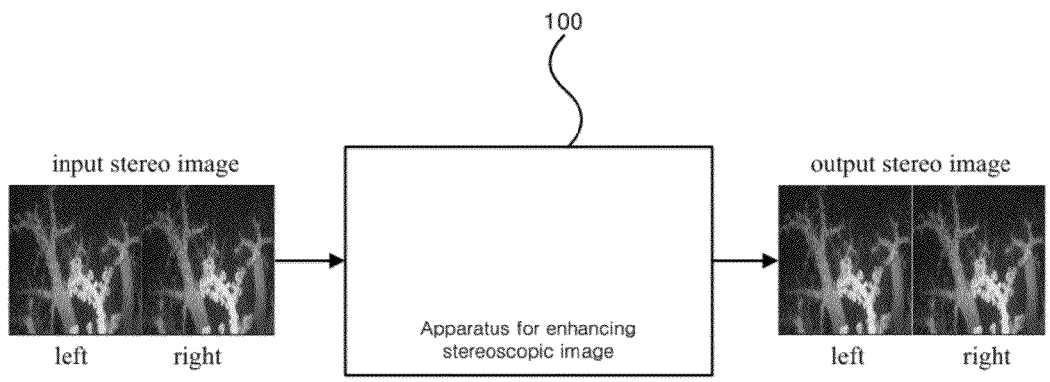
FIG. 1 schematically illustrates the operation of an apparatus for enhancing a stereoscopic image according to an embodiment of the invention.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

An apparatus for enhancing a stereoscopic image according to an embodiment of the invention can be used to readily correct imbalance between a left image and a right image forming a stereoscopic image. In the following, the descriptions will focus mainly on an example in which the apparatus for enhancing a stereoscopic image is applied to the left image and right image of a stereoscopic image. Certain embodiments of the present invention will be described below in more detail with reference to accompanying drawings.

FIG. 1 schematically illustrates the operation of an apparatus 100 for enhancing a stereoscopic image according to an embodiment of the invention.

As illustrated in FIG. 1, the apparatus 100 for enhancing a stereoscopic image may correct an imbalance between the inputted left image and right image, which form a stereoscopic image, to output the stereoscopic image with enhanced quality.

Here, the degree and tendency of color imbalance in the stereoscopic image may vary according to color of the pixel, i.e. the position of the pixel color within a color space, and as such, the apparatus 100 for enhancing a stereoscopic image may correct the imbalance in the left image and right image within a 3-dimensional (3D) color space, as will be described below.

That is, rather than correcting the color values for each channel, the color values are corrected as vectors within a 3D color space, so that the imbalance in the left image and right image may be corrected more accurately compared to existing methods. To this end, the apparatus 100 for enhancing a stereoscopic image may extract the color relationships in a 3D color space for all pixels of the left image and right image, where the extracted color relationships can be expressed as vectors.

In correcting the color values as vectors in a color space, the apparatus 100 for enhancing a stereoscopic image may additionally consider the areas of the image in which the pixels are located (i.e. in the image domain). That is, the imbalance in the left image and right image may be corrected by a local method, not a global method.

Thus, in correcting the color values as vectors in a color space, the apparatus 100 for enhancing a stereoscopic image may consider the areas of the image in which the pixels are located, as well as the positions in a 3D color space, to provide the advantage of correcting color imbalance more accurately.

Examples of a 3D color space include the CIELab color space, which is modeled to be closer to human vision, and the RGB color space, which is modeled to be suitable for output from physical devices. The embodiments of the invention will be described assuming that the correction of imbalance is performed based on color relationships in a CIELab color space. It is apparent, however, that the present invention is not thus limited, and that various types of color spaces can be used that allows expression in a 3D color space.

The apparatus 100 for enhancing a stereoscopic image according to an embodiment of the invention will be described, below in more detail with reference to FIG. 2 through FIG. 5.

Figure 2:
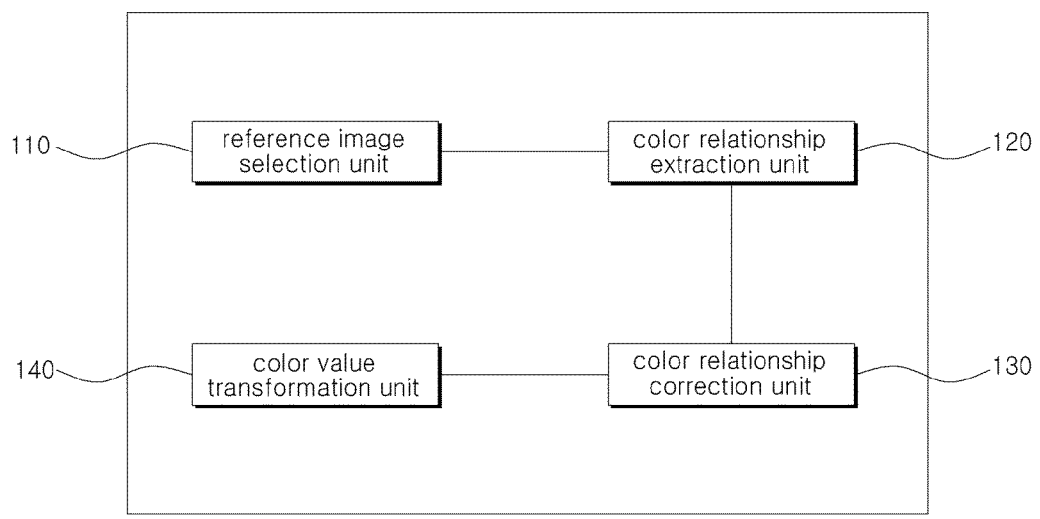
FIG. 2 illustrates the detailed composition of an apparatus for enhancing a stereoscopic image according to an embodiment of the invention.

FIG. 2 illustrates the detailed composition of a stereoscopic image enhancing apparatus 100 according to an embodiment of the invention.

As illustrated in FIG. 2, the apparatus 100 for enhancing a stereoscopic image can include a reference image selection unit 110, a color relationship extraction unit 120, a color relationship correction unit 130, and a color value transformation unit 140.

First, the reference image selection unit 110 may select any one reference image from between the left image and the right image, based on the distribution of coordinates in the 3D color space for the left image and right image forming the stereoscopic image.

To be more specific, the reference image selection unit 110 may consider the coordinates in the 3-dimensional color space for the plurality of pixels forming the left image (hereinafter referred to as a "plurality of first pixels") and the coordinates in the 3-dimensional color space for the plurality of pixels forming the right image (hereinafter referred to as a "plurality of second pixels") and may select the image having a narrower distribution of coordinates as the reference image. Based on the selected reference image, the color of the subordinate image, i.e. the remaining other image, may be corrected as described below.

The reason for this is that the image having a relatively narrower distribution of coordinates in the 3D color space has a higher quality than an image having a wider distribution. Thus, the color of the subordinate image may be corrected with respect to the reference image.

According to an embodiment of the invention, the distribution of coordinates for each of the left image and right image can be calculated by counting the number of distinctive color coordinates in each image, and the image having a smaller number may be used as the reference image.

For example, the reference image selection unit 110 can select the reference image from between the left image and the right image according to the equation below.

$$I_{ref} = \begin{cases} I_L, & \text{if } C(I_L) < C(I_R) \\ I_R, & \text{if } C(I_L) \geq C(I_R) \end{cases} \quad \text{[Equation 1]}$$

Here, $I_{ref}$ is the reference image, $I_L$ is the left image, $I_R$ is the right image, and C is an operator for counting the number of distinctive color coordinates in the image.

Figure 3:
FIG. 3 illustrates from various viewpoints the distributions of coordinates in a 3-dimensional color space for the left image and right image according to an embodiment of the invention.
Figure 3:
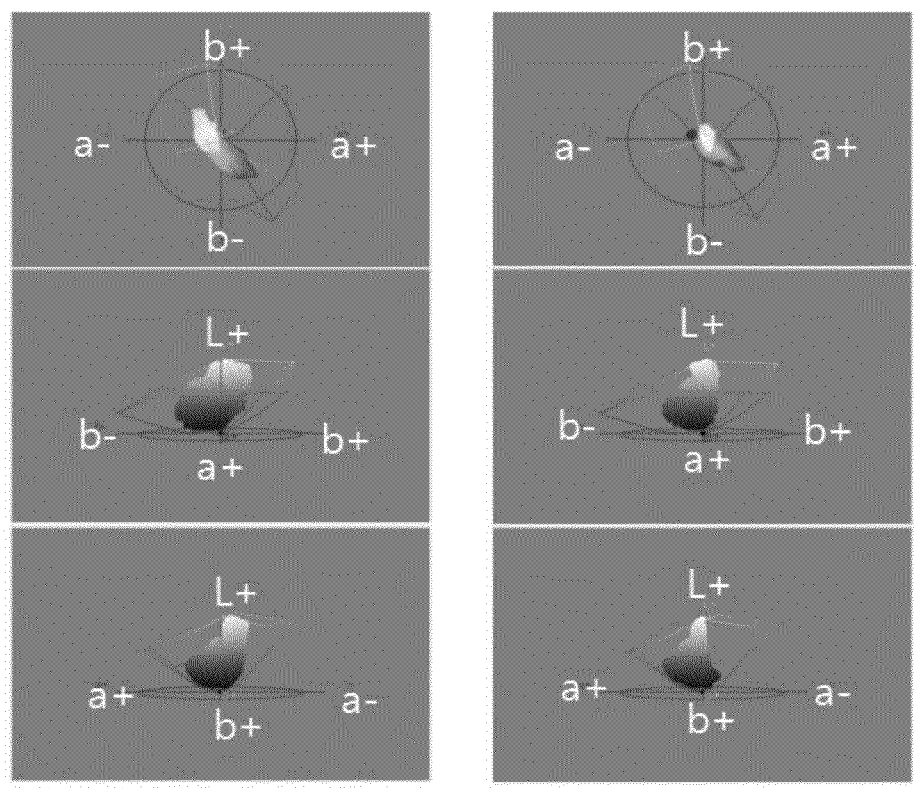

FIG. 3 illustrates from various viewpoints the distributions of coordinates in a 3D color space for the left image and right image according to an embodiment of the invention.

As illustrated in FIG. 3, since the distribution of coordinates in the 3D color space for the left image, shown on the left, is wider than the distribution of coordinates in the 3D color space for the right image, shown on the right, the reference image selection unit 110 can select the right image as the reference image. Here, the numbers of distinctive color coordinates according to an embodiment of the invention can be 120,788 for the left image and 100,753 for the right image.

For convenience, the embodiment of the invention will be described with the assumption that the right image is selected as the reference image, and the left image is the subordinate image that is to be corrected to have the same colors as the reference image.

The color relationship extraction unit 120 may extract color relationships between the coordinates in the 3D color space for the plurality of pixels forming the left image and the coordinates in the 3D color space for the plurality of pixels forming the right image.

Due to the characteristics of a stereo image, the coordinates in the 3D color space for the left image have a geometric distribution similar to that of the coordinates in the 3D color space for the right it age. Thus, by extracting the color relationships between the two so as to match the geometric distribution of the subordinate image with the geometric distribution of the reference image, the imbalance in color can be corrected based on the results.

To extract the color relationships in the 3D color space, the color relations extraction unit 120 according to an embodiment of the invention can utilize a 3D point matching technique, and can generally use an algorithm such as the iterative closest point (ICP) algorithm, the coherent point drift (CPD) algorithm, etc.

The ICP algorithm sets the color relationships based on the closest distances that associate the coordinates for the left image with the coordinates for the right image. The color relationships may be extracted according to the equation below.

$$f_{ICP} = \sum_i \|R \cdot x_i + t - y_i\|^2 \quad \text{[Equation 2]}$$

Here, R represents rotation, and t represents translational movement. The ICP algorithm is a transformation including linear rotation and linear translation, and corresponds to a strict transformation.

For example, supposing the coordinates X=(x1, ..., xN)T are given for the left image and the coordinates Y=(y1, ..., yM)T are given for the right image, the (ICP) algorithm involves transforming the coordinates for the left image to the coordinates for the right image by minimizing Equation 2 above.

The CPD algorithm is to add a displacement function to the initial position, and may extract the color relationships according to the equation below.

$$T(Y, v) = Y + v(Y) \quad \text{[Equation 3]}$$

$$f_{CPD}(v, \sigma^2) = -\sum_{n=1}^{N} \log \sum_{m=1}^{M} e^{-\frac{\|x_n - y_m\|^2}{2\sigma^2}} + \frac{\lambda}{2}\phi(v)$$

Here, v is the displacement function, φ(v) is a normalization term, λ is a trade-off parameter, and σ² is the covariance of the mixed model. The CPD corresponds to a stochastic flexible algorithm.

As the present invention relates to an apparatus for enhancing the quality of a stereoscopic image, and algorithms for extracting the color relationships of coordinates in a 3D color space are widely known, the description of this embodiment of the invention will not delve further into algorithms for extracting the color relationships. It is to be appreciated that various algorithms for extracting the color relationships of coordinates in a 3D color space can be applied to the color relationship extraction unit 120 of the present invention.

Figure 4A:
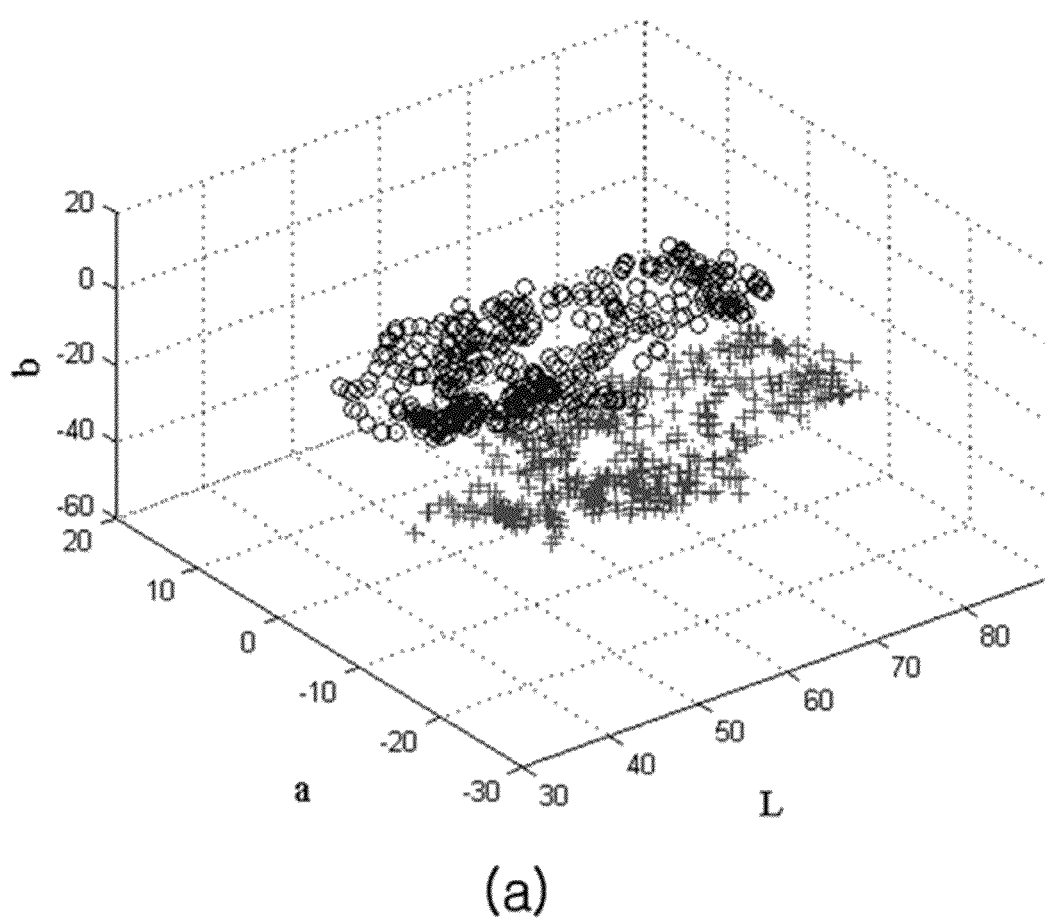
FIG. 4A and FIG. 4B illustrate an example in which a 3-dimensional point matching technique is applied to extract color relationships of the left image and right image according to an embodiment of the invention.
Figure 4B:
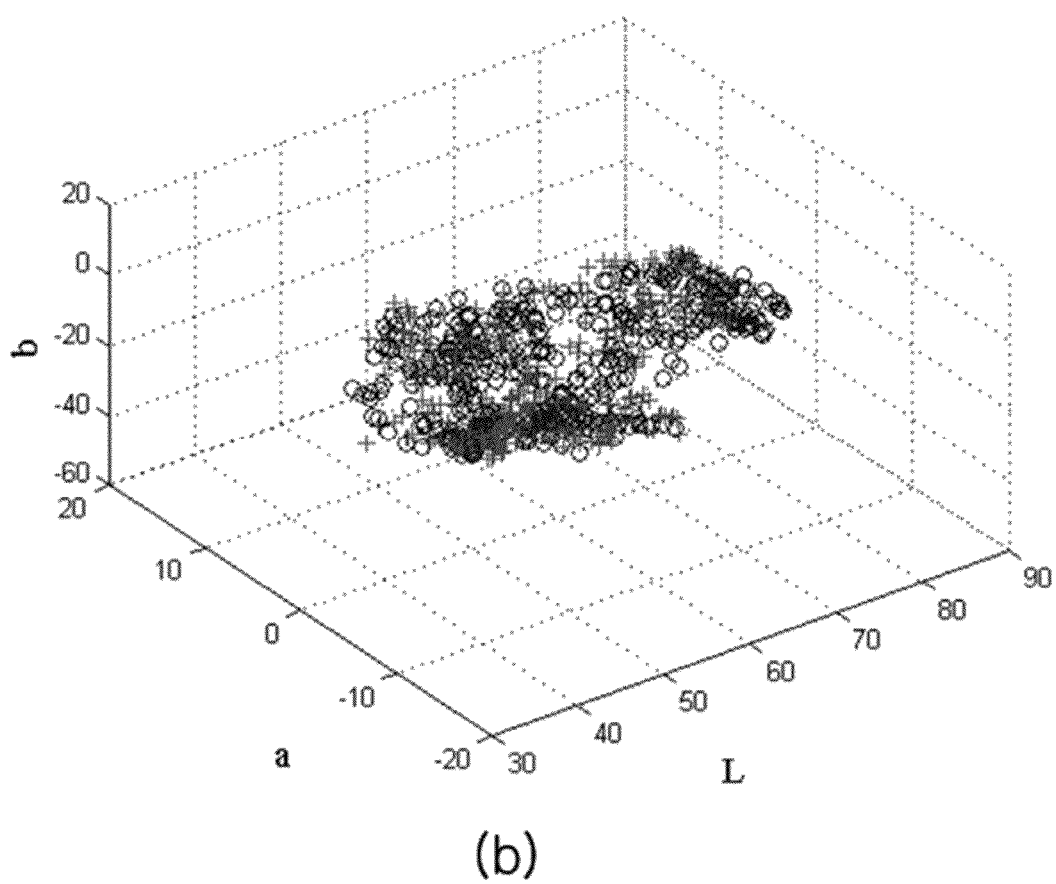

FIG. 4A and FIG. 4B illustrate an example in which a 3D point matching technique is applied to extract color relationships of the left image and right image according to an embodiment of the invention, where FIG. 4A illustrates the state before the matching, and FIG. 4B illustrates the state after the matching.

As illustrated in FIG. 4, the color relationship extraction unit 120 can extract the color relationships between the coordinates of the plurality of first pixels forming the left image and the coordinates of the plurality of second pixels forming the right image in a 3D color space.

According to an embodiment of the invention, the coordinates in the 3D color space for the plurality of first pixels and the coordinates in the 3D color space for the plurality of second pixels can be expressed by vectors as in the equation below.

$$A(p,q) = X_{Y(p,q)} - Y(p,q) \quad \text{[Equation 4]}$$

Here, (p, q) is a position in the subordinate image, Y(p, q) is a vector in the 3D color space for the pixel located at (p, q), and $X_{Y(p,q)}$ is a vector in the 3D color space for the pixel of the reference image having a color relationship with Y(p, q).

The extraction of color relationships in the 3D color space for the plurality of first pixels and the plurality of second pixels, performed by the color relationship extraction unit 120, may be performed for all pixels of the left image and right image, and for efficient computation, can be performed for each pixel line of the left image and right image. For example, the color relationships can be extracted for pixels in row 1 of the left image and row 1 of the right image, and then for pixels in row 2 in sequential order, up to the pixels of the last row.

Also, the color relationships extracted by the color relationship extraction unit 120 can be stored in a storage medium to be utilized by the color relationship correction unit 130 and the color value transformation unit 140 described below.

Next, the color relationship correction unit 130 may correct the color relationship for any one first pixel (hereinafter referred to as the "target pixel") from among the plurality of first pixels forming the left image, based on the color relationships of each of the plurality of pixels having coordinates that exist within a particular distance from the coordinates of the target pixel in the 3D color space. Here, the particular distance may refer to the distance to a pixel having a color similar to that of the target pixel.

This is because the imbalance between the left image and the right image cannot be corrected from just the color relationships extracted by the color relationship extraction unit 120 as in Equation 4 above.

Since the color relationships extracted by the color relationship extraction unit 120 may generally include defects or errors, etc., that can occur during a 3D point matching process, the imbalance between the left image and right image may not be properly corrected if the extracted color relationships are applied untouched to the target pixel. Thus, in order to compensate for defects or errors that may be present in the extracted color relationships, the color relationship correction unit according to an embodiment of the invention may incorporate information regarding colors surrounding the target pixel in handling the color relationship of the target pixel.

Here, the color relationship correction unit 130 according to an embodiment of the invention can compute the average of the color relationships for the plurality of pixels having coordinates that exist within a particular distance from the coordinates of the target pixel in the 3D color space, and can correct the color relationship of the target pixel such that it corresponds to the average of the computed color relationships.

That is, the color relationship correction unit 130 may correct the color relationships in the 3D color space between the plurality of first pixels and the plurality of second pixels extracted by the color relationship extraction unit 120 such that the color relationship of each target pixel corresponds to an average of the color relationships of the plurality of pixels surrounding the target pixel in the 3D color space.

As described earlier, a set of coordinates in a 3D color space can be expressed as a vector in the 3D color space, and thus, the color relationship correction unit 130 can also correct the color relationship of a target pixel based on an average of color relationships of the plurality of pixels expressed as vectors that exist within a particular distance from the vector for the target pixel in the 3D color space.

When correcting the color relationships as above, the color relationship correction unit 130 according to an embodiment of the invention can select two or more pixels that exist within a particular area centering around the target pixel, select one or more pixels having coordinates within a particular distance from among the selected two or more pixels, and correct the color relationship of the target pixel based on the color relationships of the selected one or more pixels.

For example, in correcting a target pixel based on the color relationships extracted by the color relationship extraction unit 120, the color relationship correction unit 130 may consider not only the position of the target pixel in the 3D color space (i.e., in color space) but also the position of the target pixel in the image (i.e. in the image domain), in order to reflect the color relationships of the plurality of pixels present around the target pixel.

Figure 5:
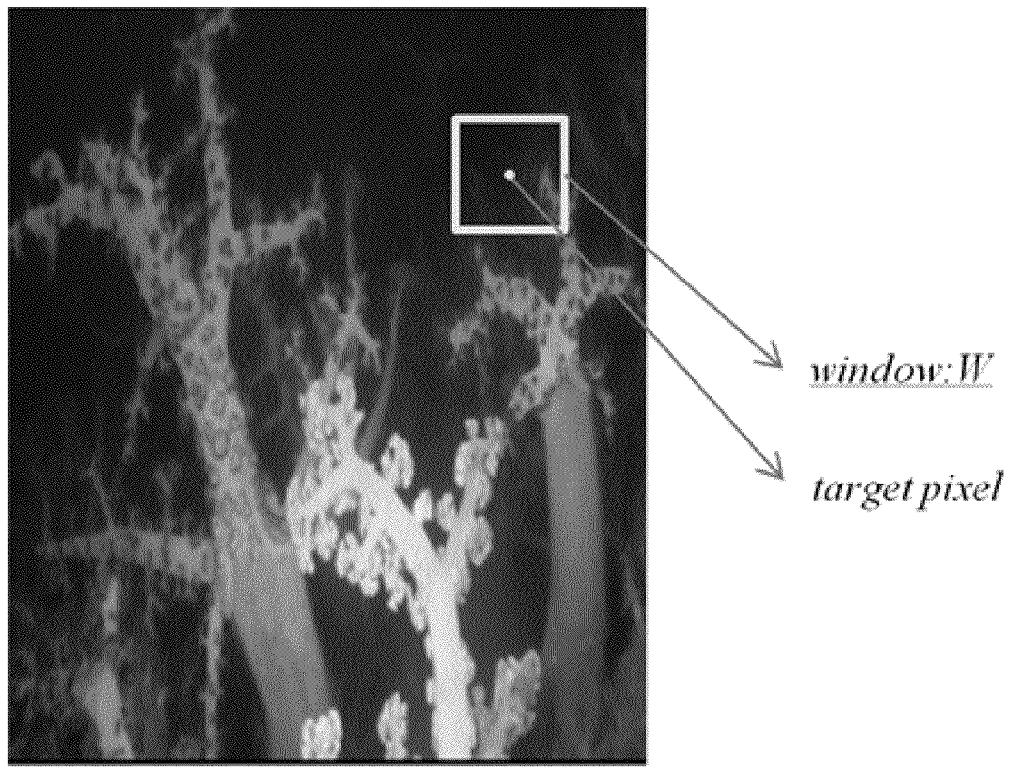
FIG. 5 illustrates an operation of the color relationship correction unit of correcting a color relationship extracted by the color relationship extraction unit according to an embodiment of the invention.

FIG. 5 illustrates an operation of the color relationship correction unit 130 of correcting a color relationship extracted by the color relationship extraction unit 120 according to an embodiment of the invention.

As illustrated in FIG. 5, the color relationship correction unit 130 may set a particular area W centering around a target pixel in the left image, and may correct the color relationship of the target pixel based on the color relationships of the plurality of pixels that exist within a particular distance in the 3D color space from among the plurality of pixels that exist in W.

According to an embodiment of the invention, the color relationship correction unit 130 can correct the color relationship according to the equation below.

$$\hat{A}(p, q) = \frac{1}{N_T} \sum_{i,j \in W} D_c[Y(i, j)] \quad \text{[Equation 5]}$$

-continued $$D_c[Y(i,j)] = \begin{cases} A(i,j), & \text{if } \|Y(i,j) - Y(p,q)\|^2 \leq T_d \\ 0, & \text{if } \|Y(i,j) - Y(p,q)\|^2 > T_d \end{cases}$$

Here, (p, q) is a position of the target pixel, W is a particular area, (i, j) is a position of each of the plurality of pixels that exist within the particular area Y(i, j) is a vector in the 3-dimensional color space for each of the pixels located at (i, j), A(i, j) is a color relationship of each of the pixels located at (i, j), $T_d$ is a particular distance, $D_c$ is an operator for selecting the plurality of pixels having coordinates existing within the particular distance, $N_T$ is the number of pixels having coordinates existing within the particular distance, and Â(p, q) is the average of the color relationships.

According to Equation 5 above, if the distance between the vector in color space for a pixel located at (i, j) within a particular area W of the subordinate image and the vector in color space for a pixel located at (p, q), which is the center of the particular area W of the subordinate image, is smaller than a particular distance, i.e. a threshold value of $T_d$, then $D_c$=A(i, j); otherwise, Dc=0. Ultimately, Â(p, q) may be given an average value of the color relationships for the plurality of pixels having coordinates that lie within a particular distance, from among the plurality of pixels existing within the particular area W centering around the target pixel.

In this way, the color relationship correction unit 130 according to an embodiment of the invention may compute the average of color relationships for a target pixel in a stereoscopic image, in consideration of the area W (a particular area) of the image in which the target pixel is located and of the local properties (D[Y(i, j)]) of the target pixel in the 3D color space, to allow the target pixel to be transformed by the color value transformation unit 140 based on the computed average of the color relationships as will be described below.

Similar to the operation of the color relationship extraction unit 120 described above, the color relationship correction unit 130 can also compute the average of color relationships centering around a pixel according to Equation 5 above, for all of the plurality of first pixels forming the left image, with the averages stored in a storage medium to be utilized by the color value transformation unit 140 described below.

For example, the color relationship correction unit 130 may calculate the average of color relationships centering on a first of the plurality of first pixels forming the left image, and then calculate the average of color relationships centering on the second of the plurality of first pixels in sequential order, and repeat the same process in a continuous manner. The averages of the color relationships computed by the color relationship correction unit 130 can be stored in a storage medium to be utilized by the color value transformation unit 140 described below.

Lastly, the color value transformation unit 140 may transform the color value of the target pixel by using the color relationship corrected by the color relationship correction unit 130.

To be more specific, the color value transformation unit 140 may apply the color relationships corrected by the color relationship correction unit 130 to the vectors of the plurality of first pixels forming the left image, to consequently correct the color imbalance in the left image and right image.

According to an embodiment of the invention, the color value transformation unit 140 can transform the color value of the target pixel according to the equation below.

$$\hat{Y}(p,q) = Y(p,q) + \hat{A}(i,j) \quad \text{[Equation 6]}$$

Here, Y(p, q) is a vector in the 3D color space for the target pixel, Â(p, q) is the average of the color relationships of the plurality of pixels having coordinates that exist within a particular distance from among the plurality of pixels that exist within a particular area centering around the target pixel, and Ŷ(p, q) is a vector the 3D color space for the transformed target pixel.

According to Equation 6 above, the vector Y(p, q) for a target pixel may be added by the average Â(p, q) of the color relationships of pixels located around the target pixel and may thus be transformed to be the same as the vector of the reference image. That is, the vector for a target pixel of the left image may be transformed to have the same vector components as the vector for the pixel of the right image with which the target vector has a color relationship.

When the vector for a target pixel is transformed by the color value transformation unit 140, the vector for the transformed target pixel can also be expressed as coordinates in the 3D color space, and thus, the transformed color value can be obtained directly from the vector or the coordinates of the transformed target pixel.

Similar to the color relationship extraction unit 120 and the color relationship correction unit 130 described above, the color value transformation unit 140 may sequentially transform the vectors for all of the plurality of first pixels forming the left image, to correct mismatching between the left image and right image.

For example, the color value transformation unit 140 may transform the first of the plurality of first pixels forming the left image by applying the average of color relationships for the first of the pixels computed by the color relationship correction unit 130, and then transform the second of the plurality of first pixels by applying the average of color relationships for the second of the pixels computed by the color relationship correction unit 130 in sequential order. By continuously repeating the same process, the transformation may be performed for all of the plurality of first pixels forming the left image.

In this way, the apparatus 100 for enhancing a stereoscopic image according to an embodiment of the invention, when correcting imbalance in a stereoscopic image, may consider not only the area of the image in which the pixel is located (i.e. in the image domain) but also the position in the 3D color space (i.e. in color space), to correct a color imbalance more accurately.

Figure 6:
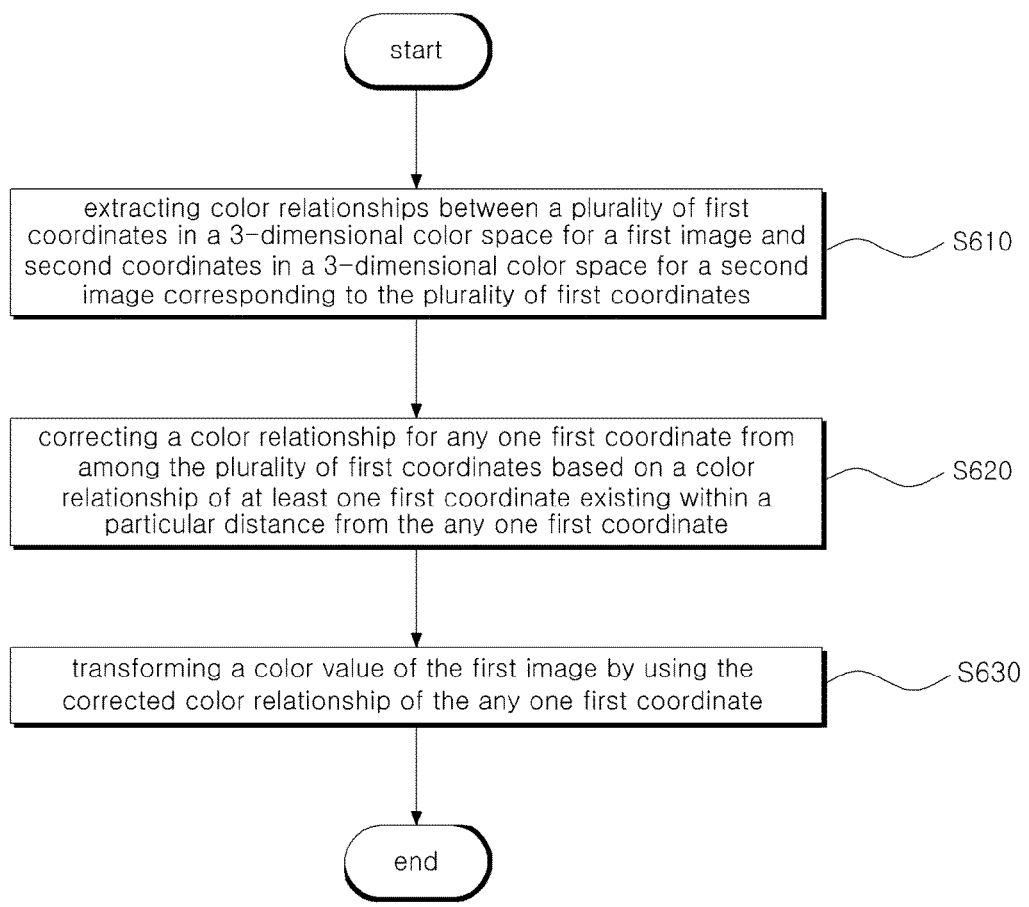
FIG. 6 is a flowchart detailing a method for enhancing a stereoscopic image according to an embodiment of the invention.

FIG. 6 is a flowchart detailing a method for enhancing a stereoscopic image according to an embodiment of the invention.

As illustrated in FIG. 6, the method for enhancing a stereoscopic image may include extracting color relationships (S610), correcting the color relationships (S620), and transforming color values (S630).

First, in step S610, the color relationships may be extracted between a plurality of first coordinates for a first image in a 3D color space and a plurality of second coordinates for a second image in a 3D color space corresponding to the plurality of first coordinates, respectively.

Next, in step S620, the color relationship for any one first coordinate from among the plurality of first coordinates may be corrected, based on the color relationship of at least one first coordinate existing within a particular distance from the any one first coordinate.

Here, the color relationship of the any one first coordinate can be corrected such that it corresponds to an average of the color relationships of the at least one first coordinate.

Lastly, in step S630, the color values of the first image may be transformed using the color relationship of the any one first coordinate corrected in step S620.

According to an embodiment of the invention, the method can further include the step of selecting any one reference image from between the first image and the second image, based on the distribution of coordinates in the 3D color space for the first image and the distribution of coordinates in the 3D color space for the second image.

A description is provided above of a method for enhancing the quality of a stereoscopic image according to certain embodiments of the invention. The features of the apparatus 100 for enhancing a stereoscopic image described earlier with reference to FIG. 1 through FIG. 5 can also be applied to these embodiments. Thus, a detailed description of such features will not be repeated.

The embodiments of the present invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An apparatus for enhancing a stereoscopic image, the apparatus comprising a processor configured to provide:
a color relationship extraction unit configured to extract color relationships between a plurality of first coordinates in a 3-dimensional color space for a first image and second coordinates in a 3-dimensional color space for a second image corresponding to the plurality of first coordinates;
a color relationship correction unit configured to correct a color relationship for any one first coordinate from among the plurality of first coordinates based on a color relationship of at least one first coordinate existing within a particular distance from the any one first coordinate;
a color value transformation unit configured to transform a color value of the first image by using the corrected color relationship of the any one first coordinate;
wherein the plurality of first coordinates are coordinates of a plurality of first pixels forming the first image, and the plurality of second coordinates are coordinates of a plurality of second pixels forming the second image;
wherein the color relationship correction unit is configured to:
select two or more first pixels existing within a particular area encompassing any one first pixel from among the plurality of first pixels,
select one or more first pixels from among the two or more first pixels, the one or more first pixels having first coordinates existing within the particular distance from a first coordinate of the any one first pixel, and
correct a color relationship of the any one first pixel based on a color relationship of the one or more first pixels; and
wherein the color relationship correction unit corrects the color relationship of the any one first pixel according to equations listed below:

$$\hat{A}(p, q) = \frac{1}{N_T} \sum_{i,j \in W} D_c[Y(i, j)],$$

$$D_c[Y(i, j)] = \begin{cases} A(i, j), & \text{if } \|Y(i, j) - Y(p, q)\|^2 \leq T_d \\ 0, & \text{if } \|Y(i, j) - Y(p, q)\|^2 > T_d, \end{cases}$$

where (p, q) is a position of the any one first pixel, W is the particular area, (i, j) is a position of each of the two or more first pixels existing within the particular area, Y(i, j) is a vector in a 3-dimensional color space for each of the two or more first pixels located at (i, j), A(i, j) is a color relationship of each of the two or more first pixels located at (i, j), Td is the particular distance, $D_c$ is an operator for selecting the one or more first pixels having first coordinates existing within the particular distance, $N_T$ is a number of the one or more first pixels having first coordinates existing within the particular distance, and $\hat{A}(p, q)$ is the corrected color relationship of each of the one or more first pixels.

* * * * *